United States Patent [19]

Daghe et al.

[11] Patent Number: 4,614,113
[45] Date of Patent: Sep. 30, 1986

[54] WATER METER SERVICE INSTALLATION

[75] Inventors: Joseph L. Daghe, Decatur; Robert E. Sands, Shelbyville, both of Ill.

[73] Assignee: Mueller Co., Decatur, Ill.

[21] Appl. No.: 718,360

[22] Filed: Apr. 1, 1985

[51] Int. Cl.⁴ .............................................. G01F 15/18
[52] U.S. Cl. .................................. 73/201; 137/454.2; 137/512
[58] Field of Search .......................... 73/201, 273, 276; 137/454.2, 512, 515.7

[56] References Cited

U.S. PATENT DOCUMENTS

| | | |
|---|---|---|
| 691,904 | 1/1902 | Hallbergh . |
| 757,932 | 4/1904 | Jones . |
| 796,252 | 8/1905 | Ross et al. . |
| 802,436 | 10/1905 | Van Order . |
| 996,099 | 6/1911 | Leidecker ........................ 137/515.7 |
| 1,107,532 | 8/1914 | Lofton . |
| 1,130,792 | 3/1915 | Burton . |
| 1,133,386 | 3/1915 | Lofton . |
| 1,169,976 | 2/1916 | Lofton . |
| 1,495,011 | 5/1924 | Ford ..................................... 73/201 |
| 2,619,837 | 12/1952 | Ford . |
| 2,620,830 | 12/1952 | Schultz . |
| 2,650,837 | 9/1953 | Smith et al. . |
| 2,750,958 | 6/1956 | Baker et al. ....................... 137/515.7 |
| 2,781,056 | 2/1957 | Carufel . |
| 2,797,707 | 7/1957 | Hursh . |
| 2,892,641 | 6/1959 | Ford . |
| 3,072,136 | 1/1963 | Roos . |
| 3,083,693 | 4/1963 | Kunz . |
| 3,262,464 | 7/1966 | Frantz . |
| 3,443,436 | 5/1969 | Meyer . |
| 3,485,371 | 12/1969 | Costantini . |
| 3,511,524 | 5/1970 | Ford et al. . |
| 3,756,275 | 9/1973 | Barrera . |
| 3,821,964 | 7/1974 | Bacon ............................... 137/454.2 |
| 3,894,432 | 7/1975 | Coughlin . |
| 3,961,528 | 6/1976 | Ford . |
| 4,284,097 | 8/1981 | Becker et al. . |
| 4,420,010 | 12/1983 | Becker et al. . |
| 4,532,958 | 8/1985 | Napolitano ....................... 137/515.7 |

FOREIGN PATENT DOCUMENTS 2517198 10/1976 Fed. Rep. of Germany ........ 73/201

OTHER PUBLICATIONS

"Water Meter Installation Applications", Watts Regulator Company, Watts No. 7 Residential Dual Check Backflow Preventer, Jun. 1981.

Primary Examiner—Herbert Goldstein
Attorney, Agent, or Firm—Cushman, Darby & Cushman

[57] ABSTRACT

A water meter service installation including both a water meter and a backflow protection device, both utilizing the same water meter box. The present installation can be retrofitted to existing meter boxes in the field as an elongated tubular extension is detachably connected to the water meter box in alignment with an opening therein, the extension extending therefrom and being capable of housing a cartridge insert member telescopingly positioned therein, the cartridge insert member having a pair of check valves in series to prevent backflow of water through the meter. By utilizing the tubular extension bolted to the exterior of the meter box, very little, if any area is taken up within the meter box and, thus, an existing meter box can still accommodate the conventional water meter while being provided with a backflow protection device in the form of a double valve cartridge insert.

11 Claims, 8 Drawing Figures

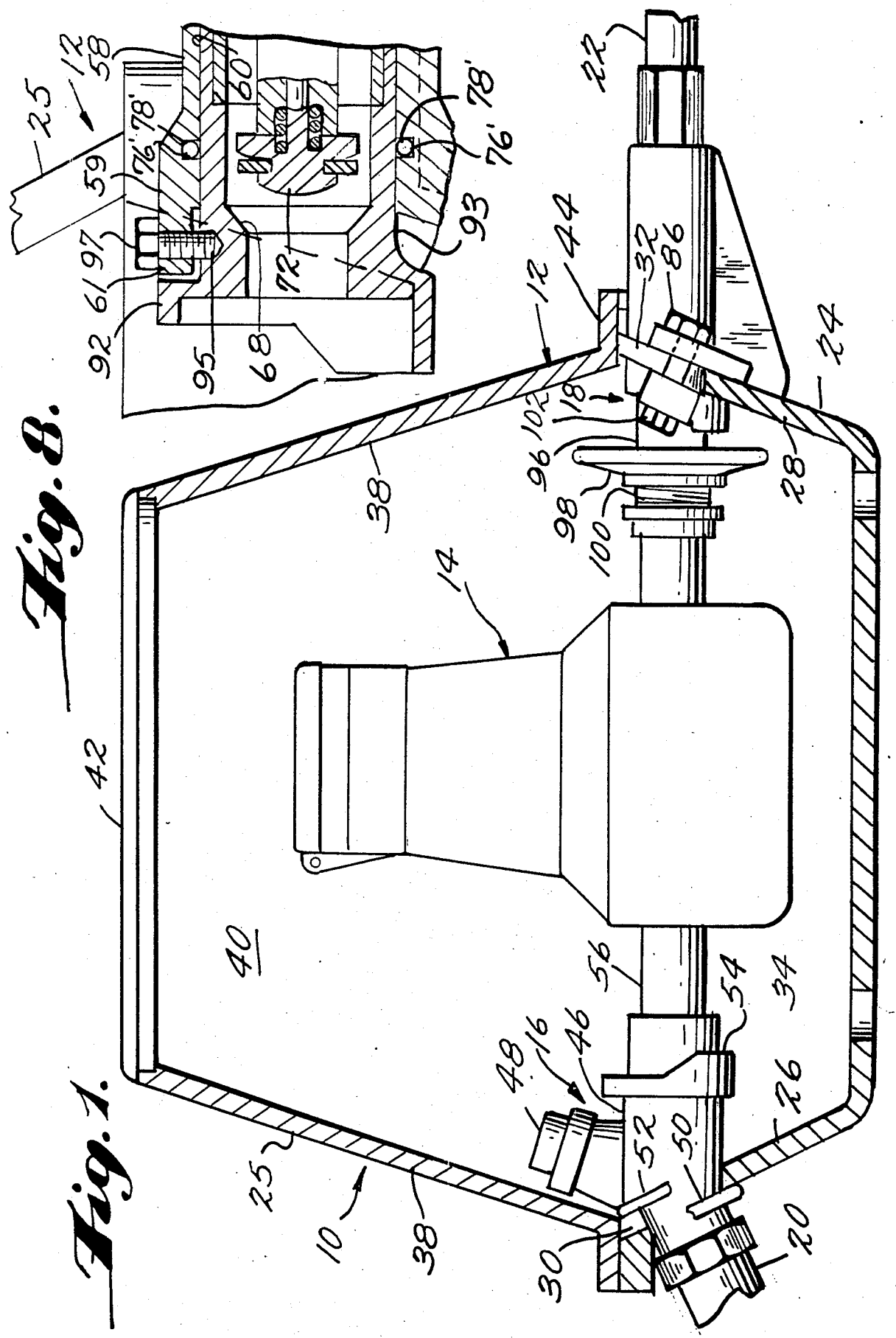

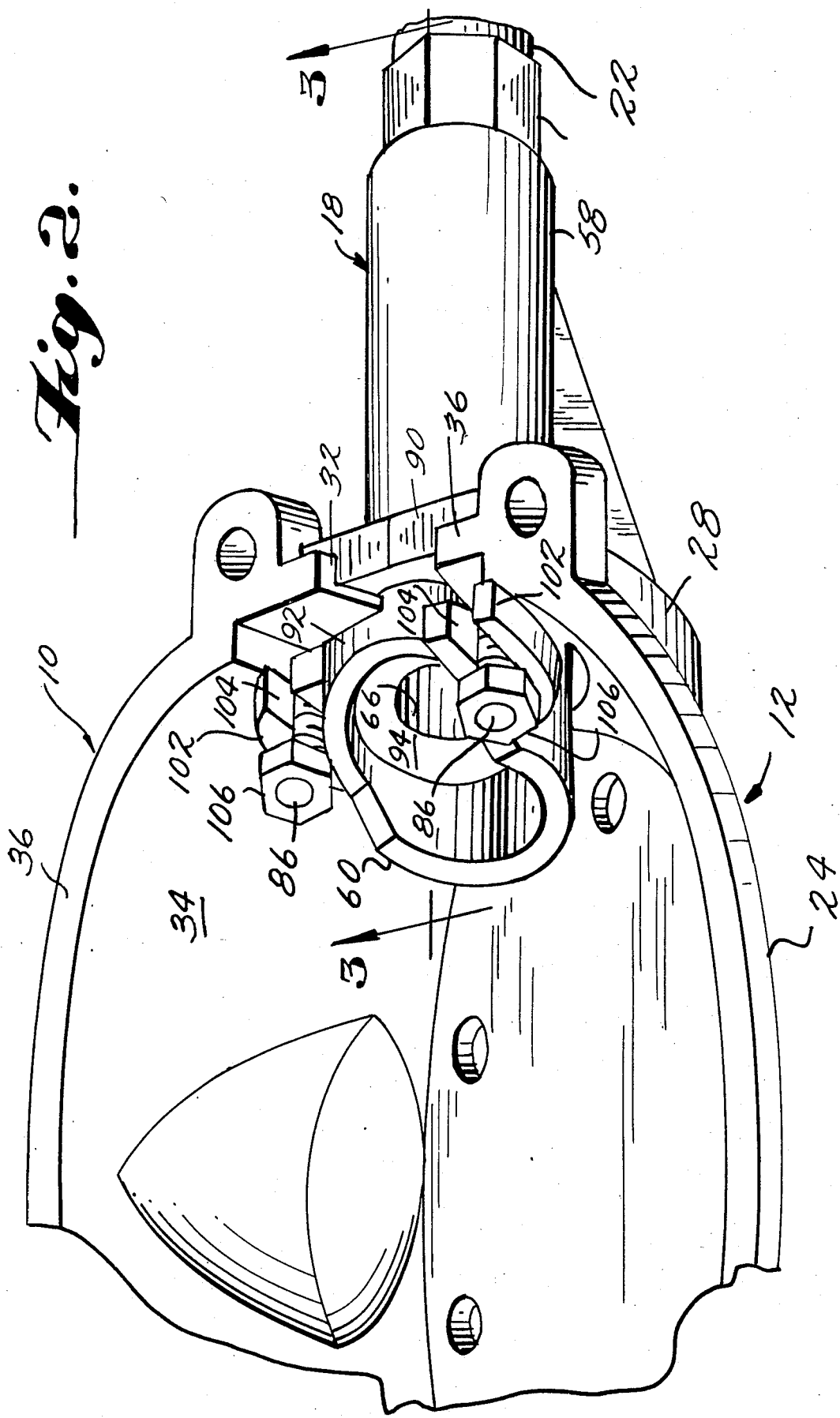

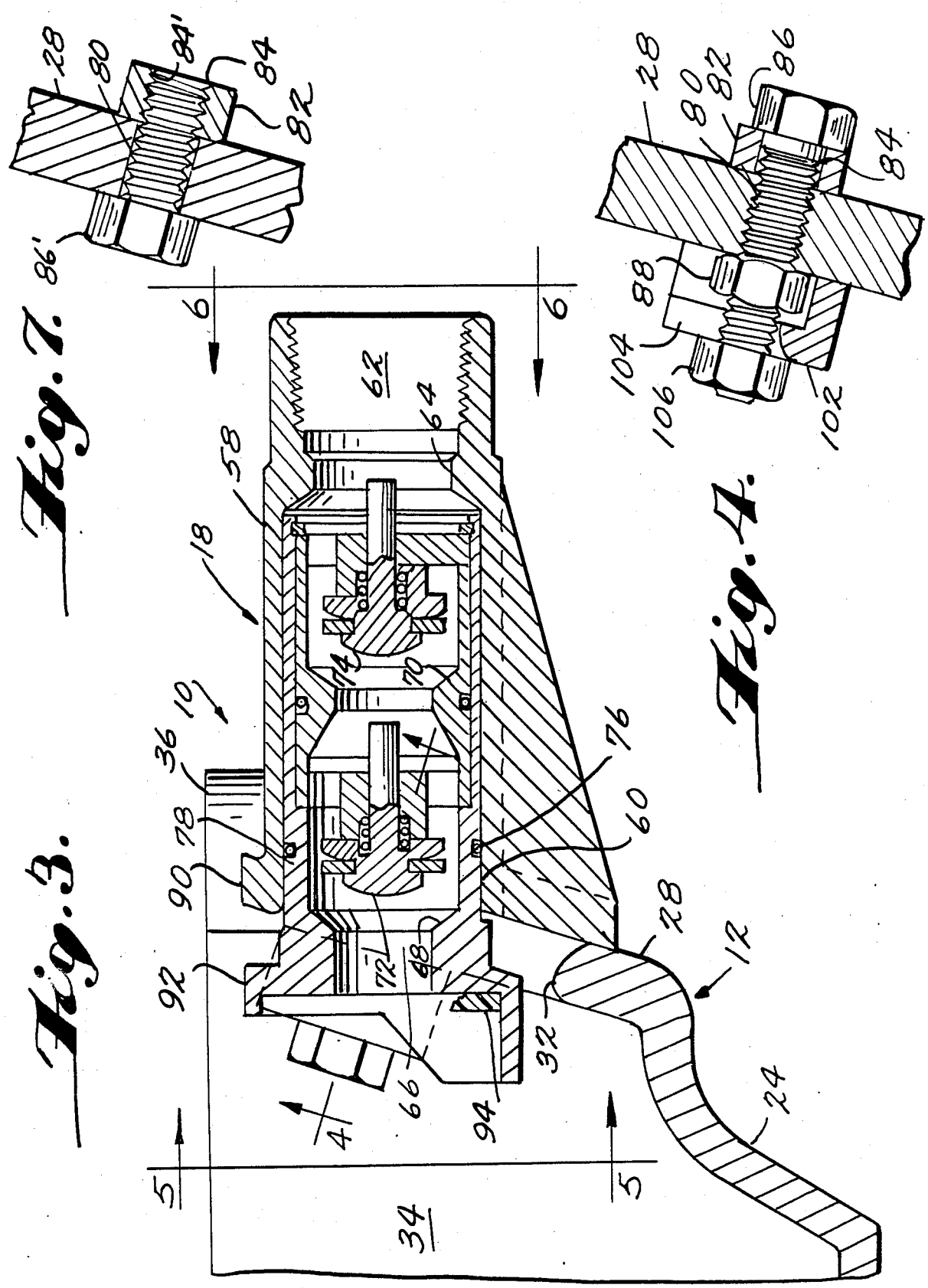

WATER METER SERVICE INSTALLATION

FIELD OF THE INVENTION

The present invention relates to a water meter service installation which includes not only the conventional water meter housed in a meter box but also carries a backflow prevention device. More specifically, the backflow prevention device includes an elongated tubular extension member extending at least outwardly from an opening in the water meter box and detachably bolted thereto. A cartridge insert member having a pair of check valves in series therein is telescopingly received into the elongated cylindrical extension member to prevent backflow from the service line through the water meter under certain conditions.

BACKGROUND OF THE INVENTION

Background preventer apparatus are well known in the art and in the past have been used in water distribution systems to prevent contamination of tne potable water portion by preventing backflow of fluid from the non-potable portion beyond a certain point in the system. Two conditions tend to cause backflow in a water distribution system. The first condition wnich could cause backflow is known as "backflow siphonage" and this occurs in the potable supply pipe or main when its pressure drops to cause a vacuum or partial vacuum of the system. This will cause a backflow of liquid from the service pipe and if the liquid in the service pipe is contaminated, will also contaminate the potable water supply. The second condition to cause backflow is a condition occurring in the service pipe or non-potable portion of the system. This condition results in a pressure condition when the pressure in the non-potable service pipe exceeds that in the potable supply pipe.

Heretofore backflow preventer devices have been primarily used in water distribution systems for large manufacturing plants and the like. The prior backflow preventer apparatus are quite large and expensive to manufacture and such devices were utilized by themselves rather than in combination with a water meter.

More recently efforts have been made to incorporate backflow preventer devices in a unit especially designed to include a water meter. Such prior efforts were rather costly to manufacture since the meter box had to be specifically designed to accommodate the size of the backflow preventer devices within the same. Other efforts were made to incorporate backflow preventer devices into a meter box installation but these systems lacked the capability of servicing the backflow preventer devices without disconnecting the installation from the service pipe and this oftentimes required digging around the meter box to make the disconnections.

PRIOR ART

The following prior art patents and publication generally relate to meter box installations incorporating check valves as a backflow preventer or to installations using check valves in combination with a water meter:

| Number    | Name       | Date of Issue |
|-----------|------------|---------------|
| 802,436   | Van Order  | Oct. 24, 1905 |
| 1,107,532 | Lofton     | Aug. 18, 1914 |
| 1,133,386 | Lofton     | Mar. 30, 1915 |
| 1,169,976 | Lofton     | Feb. 1, 1916  |
| 2,619,837 | Ford       | Dec. 2, 1952  |
| 2,650,837 | Smith et al | Sep. 1, 1953 |
| 3,443,436 | Meyer      | May 13, 1969  |
| 3,894,432 | Coughlin   | Jul. 15, 1975 |
| 4,284,097 | Becker et al | Aug. 18, 1981 |
| 4,420,010 | Becker et al | Dec. 13, 1983 |

Sales brochure of Watts Regulator Company entitled "Water Meter Installation Applications" published at least as early as June, 1981.

U.S. Pat. No. 3,894,432 discloses a combination metered water service installation unit which has a common integral housing of three contiguously juxtaposed vertical shells. The middle shell provides a sealed accommodation for the water meter whereas the inlet shell is provided with an off/on plug valve and the outlet shell is provided with a pair of pressure operated check valves to prevent backflow. Such a unit would not be capable of retrofitting existing water meters.

U.S. Pat. No. 1,169,976 discloses a meter box provided with an integrally formed threaded outlet and an inlet. The outlet is provided with a check valve threaded therein for preventing backflow but in this arrangement, the meter box must be specifically designed to incorporate the outlet having the threads for receiving the valve.

U.S. Pat. Nos. 1,133,386 and 802,436 both disclose meter boxes having a meter in combination with a check valve in the outlet from the meter box. However, to service the check valve in U.S. Pat. No. 1,133,386, the same must be disconnected from the outlet or service line as is also true in U.S. Pat. No. 802,436 wherein the entire meter box has to be removed.

U.S. Pat. No. 1,107,532 discloses in FIG. 6 a modification for the threaded outlet boss wherein a check valve is utilized to prevent backflow. This arrangement again requires a specially designed meter box having an integral screw threaded boss formed therein.

The publication "Water Meter Installation Applications" of Watts Regulator Company discloses various arrangements of utilizing a backflow preventer device in combination with a meter but in the combinations shown, a specially enlarged meter box is required to accommodate for the space required for the addition of the backflow preventer device in the system.

The remaining patents listed above are of general interest in that they show various meter box and meter mountings as well as in-line backflow preventers.

BRIEF SUMMARY OF THE INVENTION

The present invention relates to an improved water meter service installation which includes a water meter box which may be retrofitted with a backflow preventer device in combination with the water meter. More specifically, the water meter box, which is of generally conventional design includes a bottom tray section having side walls, end walls with oppositely disposed openings therein and an upper section having side walls and end walls and a downwardly facing mouth for mating with the upwardly facing mouth of the bottom tray section in a common plane. A first meter support fitting means with a passage therethrough is carried by the bottom tray section in alignment with one of the openings, the first meter support fitting means being connected on its outer end to a water inlet line. The inner end of the first meter support fitting means sealingly supports the inlet to the water meter. A second meter support fitting means is also carried by the bottom tray section in alignment with the other opening in the same, the second meter support fitting means being arranged to be connected to a water outlet or service line. The second meter support fitting means includes an elongated tubular extension member detachably carried by the bottom tray section and extending outwardly thereof. The tubular extension member is adapted to be attached to the outlet or service line and is in alignment with the other of the openings in the end wall of the bottom tray section. A cartridge insert member is telescopingly slid into the elongated tubular extension member from the interior of the water meter box, the cartridge insert member having an end portion positioned within the bottom tray section for sealingly supporting the water meter. A pair of in-line check valves are provided in the passage of the cartridge insert member to prevent backflow from the water outlet or service line through the water meter to the water inlet line and sealing means are provided between the elongated tubular extension member and the cartridge insert member to prevent water from leaking back into the inside of the meter box. Means are provided to prevent the cartridge insert member against axial movement relative to the tubular extension member when the meter is inserted or removed from the installation. This insures no possible leakage after complete assembly of the installation.

By such an arrangement as described above, the cartridge insert member may be serviced solely from within the meter box by being removed axially from within the tubular insert member for repair or replacement after the meter has been removed and, thus, the tubular insert member does not have to be disconnected from the outlet or service line. Additionally, by having the elongated tubular extension member with a major portion extending outwardly from the end wall of the meter box, the cartridge insert member with the backflow preventer valves therein can be inserted into position where a majority of the same is actually positioned outside of the periphery of the meter box and, thus, will not take up space in an existing meter service installation so retrofitted.

The means provided for preventing axial movement of the cartridge insert member relative to the tubular extension member when the same has been inserted into the tubular extension member directly detachably couples the two members together. In one modification, the same bolts used to attach the elongated tubular extension member to the bottom tray section are also used to attach the cartridge insert member operatively to the tubular extension member and meter box and, thus, the cartridge insert member can still be removed without removal of the elongated tubular extension member. Another modification utilizes a set screw threaded into a threaded aperture or hole in an axially inwardly extending lug or finger on the tubular extension member, the set screw having its inner end received in a hole in the outer surface of the cartridge insert member for retention of the same.

One advantage of the meter box installation retrofitted as above described is that existing meter boxes in the field can be modified at less expense to the customer as it will not require replacement of the meter box and will require less pipe joints. Another advantage of the present invention is that if new meter boxes are being installed, they can be modified to accommodate a backflow prevention device without the necessity for a larger meter box and/or extra couplings. Finally, once installation has been set up in the field, the servicing of the meter and/or the backflow preventer device can be accomplished from entirely within the meter box without the necessity of disconnecting either the inlet line or the outlet or service line.

Also, the backflow prevention device can be tested for leakage without being removed from the meter. For testing the backflow prevention device, the water meter is removed from the meter box and any leakage of the device would then be noted at the inner end of the cartridge insert member, the inner end being located in the inside of the meter box.

BRIEF DESCRIPTION OF THE DRAWINGS

FIG. 1 is a vertical cross-sectional view, partly in elevation, of the water meter service installation of the present invention;

FIG. 2 is a fragmentary perspective view of the present invention with the meter and upper section of the meter box omitted for purposes of clarity;

FIG. 3 is a fragmentary vertical sectional view taken substantially on the line 3—3 of FIG. 2;

FIG. 4 is a fragmentary sectional view taken on the line 4—4 of FIG. 3;

FIG. 7 is a sectional view similar to FIG. 4 but disclosing a modified means of attaching the elongated tubular extension member to the end wall of the meter box; and FIG. 8 is a fragmentary vertical sectional view similar to a portion of FIG. 3 but illustrating a modified means for preventing axial movement of the cartridge insert member relative to the elongated tubular extension member.

DETAILED DESCRIPTION OF THE INVENTION

Figure 5:
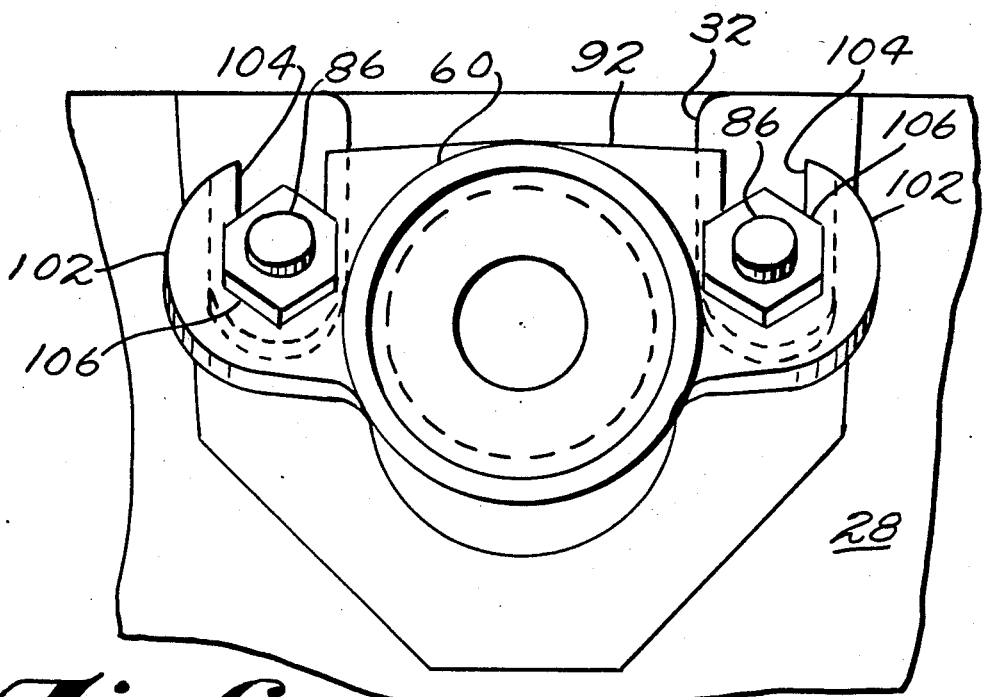
FIG. 5 is a view taken on the line 5—5 of FIG. 3.

Referring now to the drawings wherein like characters or reference numerals represent like or similar parts and in particular, to FIGS. 1-3, there is disclosed the water meter service installation of the present invention, the same being generally designated at 10. The water meter service installation 10 includes a meter box generally designated at 12, a water meter generally designated at 14 supported between a first meter support fitting generally designated at 16 and a second meter support fitting generally designated at 18. The first meter support fitting 16 is connected to a water inlet line 20 from a water main (not shown) whereas the second meter support fitting 18 is connected to an outlet or service line 22 leading to a residence or other building.

The meter box 12, which is of conventional construction and is usually buried in the ground, includes a bottom tray section 24 and an upper section 25. The bottom tray section 24 has end walls 26 and 28 with oppositely disposed openings or slots 30 and 32, the end walls 26 and 28 being connected by side walls 34. The bottom tray section 24 has an upwardly facing mouth or lip 36 about the periphery of the same. The upper section 25 has oppositely disposed end walls 38 connected by side walls 40 and it is also provided with a removable lid 42 for access to the interior of the box for reading the meter 14 or servicing the support fittings 16 and 18.

Additionally, the upper section is provided with a downwardly facing mouth or lip 44 for mating with the upwardly facing mouth or lip 36 and suitable means such as bolts (not shown) may be provided for clamping together the lips 36 and 44 of the sections 24 and 25.

The first meter support fitting 16 comprises a casing 46 for receiving a valve 48, such as a rotary plug valve which is utilized for turning the water off or on from the inlet line 20. In some instances, it may be desired to have an inlet fitting with some other type valve or fitting but not including an off/on valve 48 in the casing 46. The casing is formed externally at each of two opposite locations with a lip 50 and a further substantially parallel spaced lip 52, the lips being adapted to receive therebetween the side walls of the openings or slot 30 in the end wall 26 so that the fitting may be supported in the bottom tray section.

Additionally, the casing 46 on its inner end portion, which is positioned within the bottom tray section 24, is formed with a lip or saddle 54 coaxial with the passageway through the fitting 16. A gasket (not shown) is received in the saddle at the inner end thereof and is arranged to sealingly receive the inlet spud 56 of the meter 14.

The second meter support fitting 18 which is best shown in FIG. 3, includes an elongated tubular extension member 58 and a cartridge insert member 60 telescopingly received therein. In more detail, a passageway 62 through the elongated extension member 58 is provided with a reduced portion 64 which defines an annular flange upon which the inner end of the cartridge insert member 60 abuts when being telescoped into the elongated tubular extension member 58. The cartridge insert member 60 has a passageway 66 extending therethrough together with a pair of spaced valve seats 68 and 70 which cooperate with valve elements 72 and 74, respectively. The valve elements 72 and 74 are urged towards closed position by spring means and are opened to the position shown in FIG. 3 by pressure of water flowing through the passageway 66. This arrangement provides a pair of check valves in series functioning as a backflow preventer when a backflow situation arises in the system. The external surface of the cartridge insert member 60 is provided with a groove 76 for receiving an O ring seal 78 and, thus, when the cartridge insert member is positioned within the tubular extension member, there can be no leakage of water from the outlet service line 22 backwardly between the members 60 and 58 into the meter box 12. Likewise, should the meter box ever fill with water, there can be no leakage of water from the meter box 12 into the service line 22 so as to contaminate the same.

Figure 6:
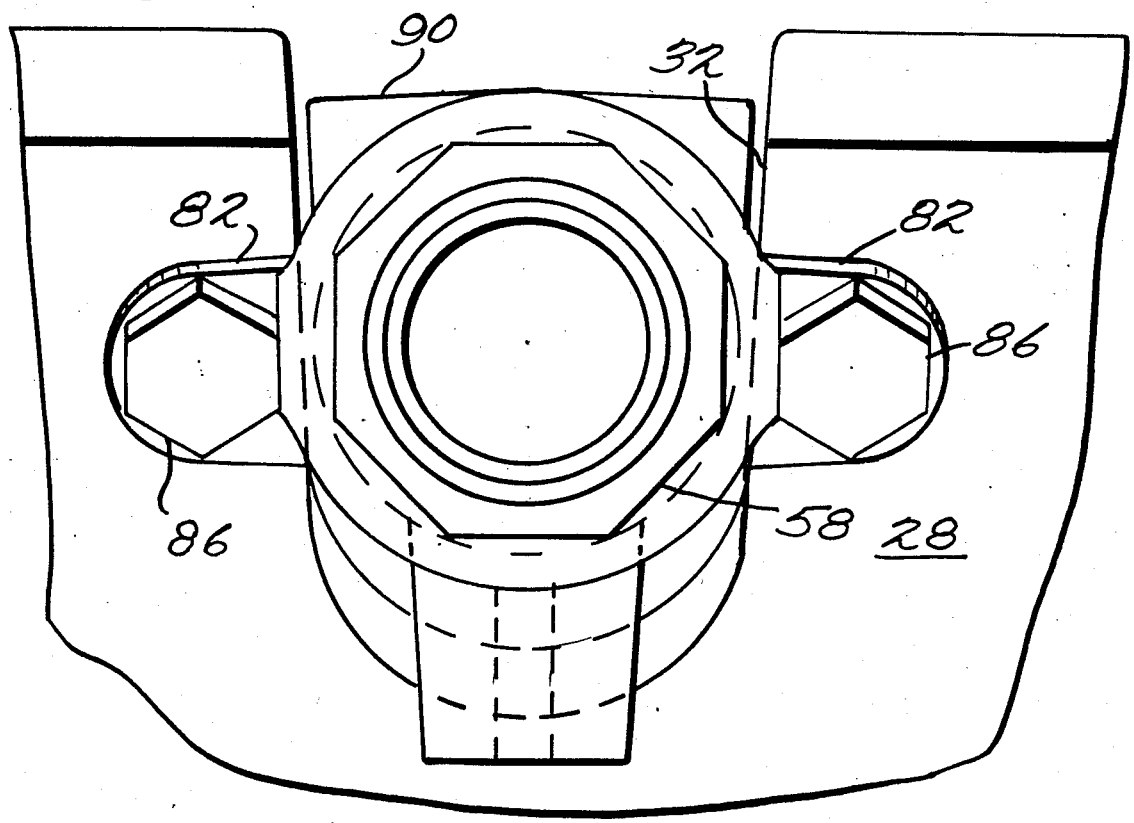
FIG. 6, is a view taken on the line 6—6 of FIG. 3.

Referring now to FIGS. 4 and 6, it will be noted that the end wall 28 of the bottom tray section 24 is provided with oppositely disposed apertures or holes 80 on either side of the slot 32 and the elongated tubular extension 58 is provided with oppositely disposed lugs 82 having apertures 84 therethrough for aligning with the apertures 80. Elongated bolts 86 extend inwardly through apertures 84 and 80 and nuts 88 are threaded thereon to detachably anchor the tubular extension member 58 into position on the bottom tray portion 24. Since the tubular extension member abuts primarily with the outer surface of the end wall 28, it is provided with a short portion 90 extending into the slot 32 for filling the same so as to block a substantial portion of the upper part of the slot from entry of debris.

The cartridge insert member 60, as best shown in FIGS. 1 and 3, has its inner end 92 extending into the interior of the meter box 12. This inner end 92 is saddle shaped and arranged to receive an annular gasket 94 against which abuts the outlet spud 96 of the meter 14. The outlet spud 96 is provided with a conventional hand wheel means 98 which is threaded onto the threads 100 and when the hand wheel means 98 is rotated, it causes the spud 96 to bear against the gasket 94 as well as causing the inlet spud 56 to bear against the gasket in the saddle 54.

Means must be provided to prevent axial displacement of the cartridge insert member 60 relative to the tubular extension member 58 and this is accomplished by providing the cartridge insert member with a pair of oppositely disposed lugs 102 for abutting the interior surface of the end wall 28. The lugs 102 have open ended slots 104 therein and are shaped to fit over the nuts 88 and the bolts 86. Since the bolts 86 are elongated, they extend outwardly through the slots 104 of lugs 102 and, thus, further nuts 106 can be threaded thereon to detachably retain the cartridge insert member 60 axially in position with respect to the tubular insert member 58.

The water meter service installation 10 just previously described permits retrofitting existing water meter boxes 12 with a meter support fitting 18 which incorporates a dual check valve arrangement for preventing backflow. As will be evident, even though the cartridge insert member 60 which carries the module of the check valves in series is positioned outwardly of the meter box, it can still be serviced from within the meter box by merely removing the meter and then telescopingly sliding the same from the tubular extension member 18. It should be noted that the tubular extension member 58 will stay in place and that the service line 22 does not have to be disconnected.

Referring to FIGS. 7 and 8, there is disclosed a modification for mounting the elongated tubular extension member 58 and the cartridge insert member 60. As shown in FIG. 7, the lugs 82 of the tubular extension member 58 have their holes 84 threaded as indicated at 84'. In this arrangement, the bolt 86' is inserted from inside the meter box 12 through the hole or aperture 80 in the end wall 28 and then threaded into the threaded apertures 84' of the lugs 82. This detachably retains the elongated tubular extension member 58 to the bottom tray section 24.

FIG. 8 discloses the modification for retaining the cartridge insert member 60 against axial movement relative to the elongated tubular extension member 58. In this respect, the elongated tubular extension member 58 is provided with an axially extending finger 59 having a threaded hole or aperture 61 therein. The end portion 93 of the cartridge insert member 60 immediately behind its inner end 92 is provided with a blind radially extending hole 95 and when a set screw 97 is threaded into the aperture 61, the end of the set screw is received in the hole 95 to prevent axial movement. By utilizing a set screw with a bolt head, the set screw 97 can be backed off a sufficient distance by an open ended box wrench without removal of the upper section 25 of the meter box 12 and, thus, the cartridge insert member 60 may be removed and serviced through the lid 42 just as in the modification shown in FIGS. 1 and 2.

FIG. 8 also shows a modification of providing the seal between the tubular extension member 58 and the cartridge insert member 60. Instead of providing the groove 76 on the exterior of the cartridge insert member 60 for receiving the O ring seal 78, a groove 76' is provided in the interior of the tubular extension member 58 for receiving the O ring seal 78'. This modification has the added advantage of preventing the O ring seal from being damaged (cut) on the side of the cast opening of the meter box when installing the cartridge insert member as well as providing for the capability of using a slightly larger cartridge insert member since the cartridge insert member is not required to support the O ring seal.

The terminology used throughout the specification is for the purpose of description and not limitation, the invention being defined by the scope of the appended claims.

What is claimed is:

1. A water meter service installation comprising:
   a water meter through which water from a water inlet line flows to a water outlet line;
   a meter box enclosing said water meter, said meter box including a bottom tray section having side walls, end walls with oppositely disposed openings therein and an upwardly facing mouth, and an upper section having side walls, end walls and a downwardly facing mouth for mating with the upper facing mouth of said bottom try section in a common plane;
   a first meter support fitting means carried by said bottom tray section in alignment with one of said openings and having a passage therethrough, said first meter support fitting means also having an outer end portion arranged to be connected to the water inlet line and inner end portion for sealingly supporting said water meter;
   a second meter support fitting means carried by said bottom tray section in alignment with the other of said openings, said second meter support fitting means being arranged to be connected to the water outlet line, said second meter support fitting means including an elongated tubular extension member carried by said bottom tray section and having a major portion of the same extending outwardly of the bottom tray in alignment with the other of said openings, said elongated tubular extension member having an outer end arranged to be connected to the water outlet line, and a cartridge insert member telescopically extending into said tubular extension member and having an end portion positioned within said bottom tray section for sealingly supporting said water meter, said cartridge insert member having a passage therethrough with a pair of check valves in series therein to prevent backflow from said water outlet line through said water meter to said water inlet line, a major portion of said cartridge insert member and said check valves being positioned in said major portion of said tubular extension member outside of said meter box;
   sealing means between said tubular extension member and said cartridge insert member;
   and means for retaining said cartridge insert member against axial movement relative to said tubular extension member, said last mentioned means permitting removal of said cartridge insert member from said tubular extension member after said meter has been removed without removal of said tubular extension.

2. A water meter service installation as claimed in claim 1 in which said means for detachably supporting said tubular extension member on said bottom tray section includes a pair of oppositely disposed lugs extending outwardly of said tubular extension member for abutting against an exterior of said bottom tray section, said lugs having apertures extending therethrough, said bottom tray section having holes extending through the one of said end walls adjacent the other of said openings for aligning with said apertures in said lugs, and threaded bolts extending inwardly of said meter box through said apertures in said lugs and through said holes, and nuts threaded onto said bolts from within said bottom tray section.

3. A water meter service installation as claimed in claim 2 in which said means for retaining said cartridge insert member against axial movement relative to said tubular extension member includes a pair of oppositely disposed lugs extending outwardly of the end portion of said cartridge insert member positioned within said bottom tray section, said lugs abutting an interior surface of said bottom tray section and having slots therein for receiving ends of said bolts outwardly of said nuts, and a second pair of nuts threaded onto said bolts and abutting against said pair of lugs on said cartridge insert member for retaining the same against axial movement relative to said tubular extension member.

4. A water meter service installation as claimed in claim 1 in which said means for retaining said cartridge insert member against axial movement relative to said tubular extension member includes providing an axially extending finger on an end of said tubular extension member, said finger extending through said other opening into said bottom tray section, said finger having a radially extending threaded aperture therethrough, said cartridge insert member having a radially inwardly extending hole in the end portion of the same positioned within said bottom tray section, said last mentioned hole being aligned with said threaded aperture of said tubular extension member when said cartridge insert member is telescopingly received in said tubular extension member, and a set screw threaded into said threaded aperture in said tubular extension member and having its end received in the hole in said cartridge insert member.

5. A water meter service installation as claimed in claim 4 in which said set screw has a bolt head thereon for reception of a wrench.

6. A water meter service installation as claimed in any one of claims 1, 4 or 5 in which said means for detachably supporting said tubular extension member on said bottom tray section includes a pair of oppositely disposed lugs extending outwardly of said tubular extension member for abutting against the one of said end walls of said bottom tray section adjacent the other of said openings, said lugs having threaded apertures therethrough, holes extending through the one of said end walls adjacent the other of said openings for aligning with said threaded apertures in said lugs, and threaded bolts extending from the interior of said meter box through said holes and threaded into said threaded apertures.

7. A water meter service installation as claimed in any one of claims 1 to 5 in which said sealing means includes an O ring carried in a groove on the exterior of said cartridge insert member, said O ring abutting the interior of said tubular extension member to prevent water from entering into said meter box.

8. A water meter service installation as claimed in any one of claims 1 to 5 in which said sealing means includes an O ring carried in a groove in said tubular extension member, said O ring abutting the exterior of said cartridge insert member.

9. A water meter service installation as claimed in any one of claims 1 to 5 wherein each of said pair of check valves in said cartridge insert member is spring urged towards closed position and opened by pressure of water flowing through said water meter.

10. A water meter service installation as claimed in any one of claims 1 to 5 wherein said upper section of said water meter box includes a removable lid for reading said water meter and/or servicing said cartridge insert member.

11. A water meter service installation as claimed in any one of claims 1 to 5 wherein said first meter support fitting means includes an off-on valve means for controlling flow of water into said meter.

* * * * *